May 15, 1928. 1,670,133
G. BERNERT
MATERIAL DISCHARGE AND CONVEYING MEANS FOR MOTOR VEHICLES
Filed April 11, 1925 2 Sheets-Sheet 1
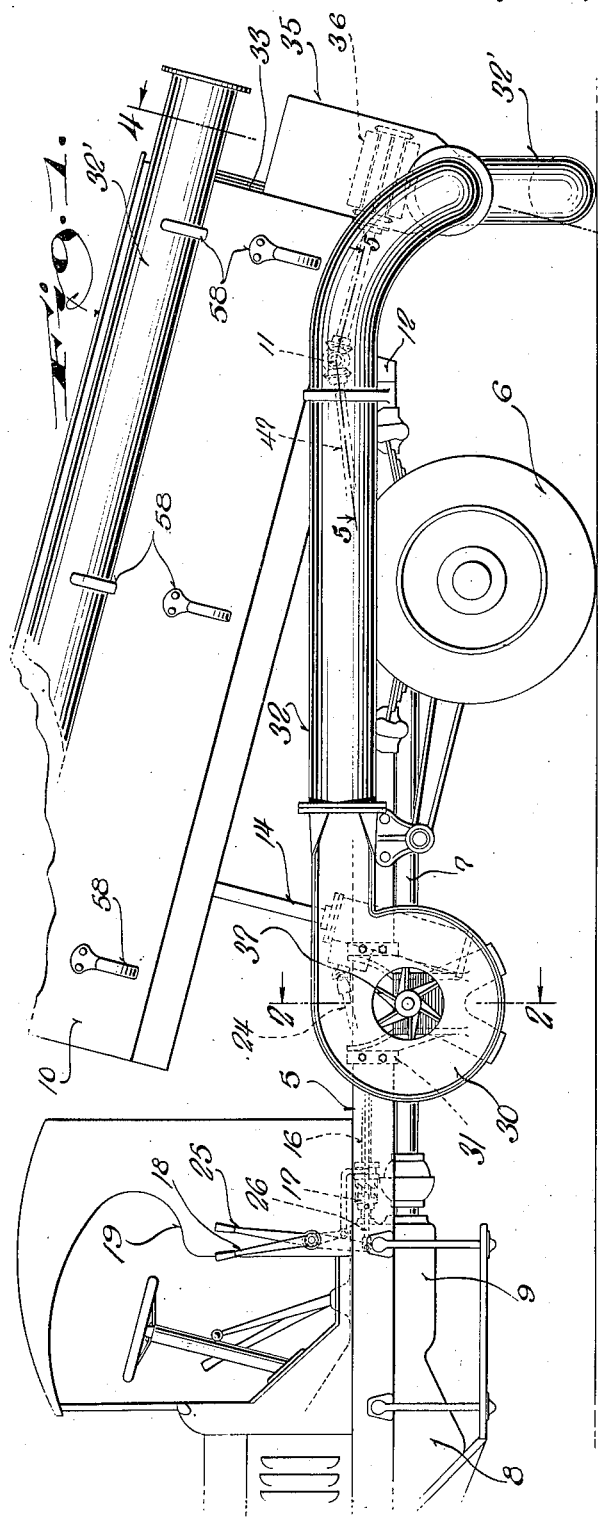
George Bernert
By Ira M. Jones
Attorney May 15, 1928.  1,670,133
G. BERNERT
MATERIAL DISCHARGE AND CONVEYING MEANS FOR MOTOR VEHICLES
Filed April 11, 1925   2 Sheets-Sheet 2
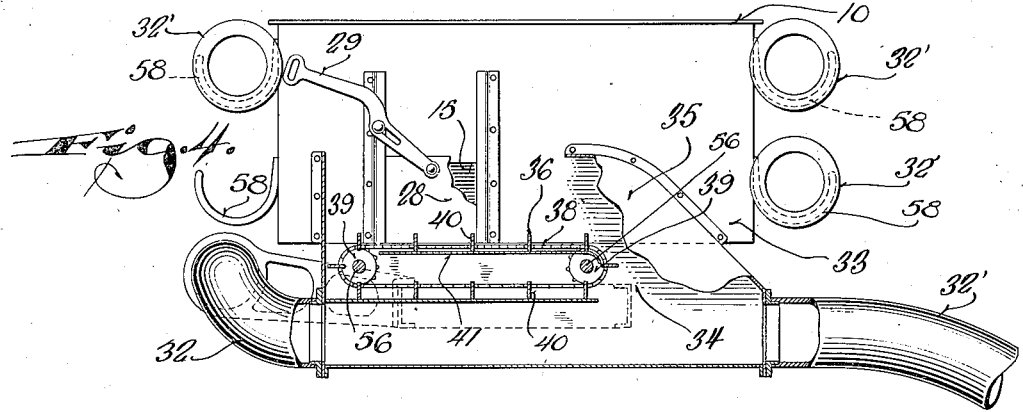
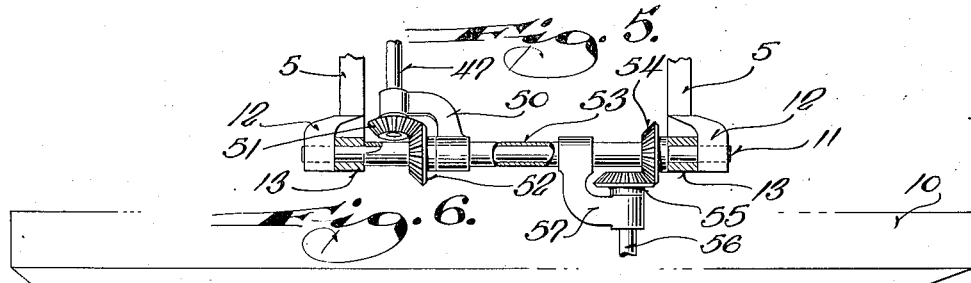
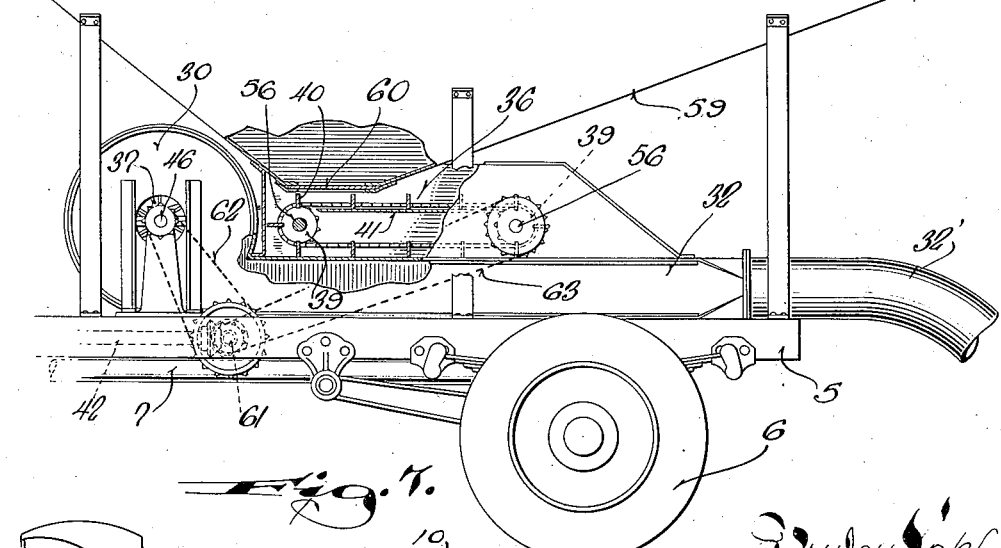
Inventor
George Bernert
By Ira M. Jones
Attorney Patented May 15, 1928.

1,670,133

UNITED STATES PATENT OFFICE.

GEORGE BERNERT, OF MILWAUKEE, WISCONSIN.

MATERIAL DISCHARGE AND CONVEYING MEANS FOR MOTOR VEHICLES.

Application filed April 11, 1925. Serial No. 22,344.

This invention relates to certain new and useful improvements in material discharge and conveying means for motor vehicles and is adapted for use in connection with the handling of various types of material.

In the handling of sand, grain, coal and other materials it is often impossible or inconvenient to position the motor vehicle or truck at the immediate point it is desired to unload and this invention has as one of its objects the provision of novel means whereby a truck may be conveniently unloaded and the material conveyed to the desired position, even though remote from the truck, without necessitating the manual handling thereof.

This invention contemplates as a more specific object the provision of a pneumatic conveyer apparatus carried by the motor vehicle or truck and arranged to receive the load from the truck and convey it to a remote point.

It is a further object of this invention to provide an improved apparatus of the character described having provision whereby the point of discharge of the material by the conveying apparatus may be varied at will.

And a still further object of this invention resides in the provision of an improved flexible conveying duct of heavy rubber or rubberized material to permit the convenient laying of the duct around obstacles to any point of discharge.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated three complete examples of the physical embodiment of my invention constructed according to the best modes I have so far devised for the practical application of the principles thereof, and in which:

Figure 1 is a side view of one form of automotive vehicle or load carrying truck equipped with my invention, the upper inner end portion of the load receiving body and the extreme forward end of the truck frame being broken away;

Figure 2 is a fragmentary detail view, partly in section and partly in elevation, taken through Figure 1 on the plane of the line 2—2;

Figure 3 is a fragmentary detail view, partly in section and partly in elevation, taken through Figure 2 on the plane of the line 3—3;

Figure 4 is a view, partly in section and partly in elevation, looking at the rear or discharge end of the frame of my invention illustrated in Figure 1, said view being taken through said figure on the plane of the line 4—4.

Figure 5 is a fragmentary detail view, partly in section and partly in elevation, taken through Figure 1 on the plane of the line 5—5;

Figure 6 is a view similar to Figure 1 of a slightly modified form of my invention, and Figure 7 is a side view of still another application of my invention.

Referring now more particularly to the accompanying drawings, in which like numerals designate like parts throughout the several views, the numeral 5 designates the side bars of an automotive vehicle or truck chassis frame which is mounted in the usual manner at its rear by propelling or drive wheels 6 and at its forward end by steering wheels, not shown. The propelling wheels 6 are connectable by a drive shaft 7 with a motor power plant 8 located at the forward end of the chassis frame and adapted to be controlled through a transmission device 9 of any construction.

Suitably mounted on the chassis frame is a load receiving body 10 and in the form of my invention illustrated in Figures 1 to 5, inclusive, the body 10 is of the tiltable type, being pivotally fixed to the rear end of the chassis frame by a pivot rod 11 mounted in brackets 12 fixed to the chassis frame and passing through brackets 13 fixed to the body. A suitable hoisting device 14 of any desired construction, is mounted at the forward portion of the chassis frame and connected with the inner end of the load receiving body to move the same on its pivot 11 and cause the material within the body to shift toward its discharge point or opening 15.

The hoisting device 14 is adapted to be actuated from the motor 10 which is provided with a power take-off shaft 16 adapted to be operatively connected with the motor through the transmission 9 by a clutch mechanism 17 adapted to be controlled from a lever 18 located at a convenient position near the driver's seat 19. The power take-off shaft 16 has its rear end journaled in a bearing mounted on a transverse beam 20 connecting the side bars 5 and has a gear 21 slidably splined thereon and adapted to be selectively engaged with gears 22 and 23. The gear 22 is fixed on a shaft 24 which is suitably journaled in the chassis frame with its axis parallel to the axis of the power take-off shaft and which is connected with the hoisting device in a suitable manner, not shown. The gear 21 is moved into and out of engagement with the gears 22 and 23 through the medium of an actuating lever 25 located adjacent the lever 18 which is connected with the gear 22 through a connecting link or rod 26 and a pivoted lever 27, see Figures 1 and 3.

The discharge opening 15 of the body 10 is normally closed by a gate member 28 which is adapted to be suitably actuated by a handle or lever 29 and the material passing from the body 10 through the opening 15 is adapted to be picked up by a pneumatic conveyor as hereinafter described and conveyed to any desired point of discharge.

The pneumatic apparatus includes a blower fan casing 30 which, in that form of my invention illustrated in Figures 1 to 5, inclusive, is secured to one side beam 5 of the chassis frame by a suitable support 31 and from which leads a conveying air duct 32, the duct passing along the side of the chassis frame and thence about the rear discharge end of the body 10 traversing the discharge 15. That portion of the conveying air duct 32 traversing the rear or discharge end of the load receiving body is preferably formed of metal and is supported directly from the body end wall 33, there being an opening 34 therein which communicates with a feeding conveying casing 35 which is formed with that portion of the air duct traversing the discharge opening 15. The opening 34 is to one side of the discharge opening 15 but at the discharge end of a mechanical conveyor 36, the receiving end of which is located under the opening 15 so that the material, upon leaving the opening, is mechanically carried to the opening 34 and discharged into the air duct 32 to be therethrough conveyed by the pressure current of air created therein by a blower fan 37 in the fan casing. The mechanical conveyor 36 in the embodiment illustrated in Figures 1 and 4, is of the endless belt type, having a belt 38 trained about end sprockets or rollers 39 and having conveying flights 40, the upper run of the belt and flights passing over a platform or plate 41, as best illustrated in Figure 4.

The fan 37 is operated from the motor 8 through the power shaft 16 and gears 21 and 23, the latter being fixed to a shaft 42 journaled in a bearing 43 carried by the transverse member 20, and having a gear 44 which meshes with a gear 45 fixed to the inner end of a transverse shaft 46 on the outer end of which the fan 37 is secured. The mechanical conveyor 36 is operated at a speed proportionate to the speed of the blower fan 37 by a drive shaft 47, the inner end of which has a beveled gear or pinion 48 meshed with a pinion 49 fixed to the shaft 46 and the outer or rear end of which is connected with one of the end rollers or sprockets 38 of the conveyer in the manner illustrated in Figure 5. The rear end of shaft 47 is journaled in a swinging bracket 50 journaled from the pivot rod or shaft 11 and has a pinion gear 51 fixed thereto which meshes with a pinion 52 fixed to a sleeve 53 journaled on the pivot shaft 11 and having another pinion 54 fixed thereto and meshed with a pinion 55 fixed on the shaft 56 of the sprocket or roller to be rotated, the inner end of shaft 56 being journaled in a swinging bracket 57 supported from the sleeve 53.

This construction permits the tilting of the load receiving body without disturbing the drive of the mechanical feeder.

The conveying air duct 32 is preferably formed in sections 32' which may be readily added to make the duct of the desired length and when not in use the sections are supported from the sides of the load receiving body 10 by suitable brackets 58. The air duct, with the exception of the part immediately adjacent the blower fan and the part traversing the rear discharge end of the body 10, is preferably made of a flexible material such as hose which may be rubberized or not so that it will readily give to any obstructions and permit the running of the duct around corners without the provision of special fittings. The air duct being of flexible material also serves to eliminate noise incidental to the passage of material therethrough, especially when it is of such a character as coal, gravel or the like.

In operation of that form of my invention illustrated in Figures 1 to 5, the hoisting device 14 is actuated to tilt the body 10 to its load discharging position illustrated in Figure 1 when the blower fan and the mechanical feeding device 36 are connected with the motor unit 18 by connecting the clutch 17 and actuating the lever 25 to mesh the gears 21 and 23. The discharge gate 28 is then opened to permit the material from the body to be discharged by the mechanical conveyer 36 through the opening 34 into the air duct 32 through which it is conveyed to the desired point of discharge. After the material has been entirely discharged from the body 10 and cleared from the duct 32, the pneumatic conveying apparatus is disconnected from the motor 8 and the hoist 14 then actuated to permit the return of the body to normal position. The sections 32' of the air duct leading from the section traversing the rear discharge end of the body are then removed and placed on the brackets on the sides of the body.

In that form of my invention illustrated in Figure 6, the body 10 is of the non-tiltable type having a hopper shaped bottom 59 provided with a discharge opening controlled by a gate 60 which is adapted to directly discharge onto the mechanical conveyer 36 which is disposed therebeneath. In this form of my invention the pneumatic conveying device is of a similar construction to that previously illustrated with the exception that the blower fan casing is directly connected with that portion of the air duct 32 traversing the body discharge opening, and the shaft 46 of the blower fan, instead of being directly connected with the counter shaft 42, is connected therewith through a counter shaft 61 and a chain and sprocket connection 62, the shaft 56 of the mechanical feeder being also connected with the shaft 61 by chain and sprocket connection 63.

That form of my invention illustrated in Figure 7 is identical with the form illustrated in Figure 1 with the exception of the manner of driving the pneumatic conveying apparatus and in this form the power take-off shaft 16 projects laterally from the side of the chassis frame and has a drive pulley or sprocket 64 fixed thereto which is belted as at 65 to the fan shaft 46, the mechanical conveyor 36 being driven from the fan shaft 46 by a suitable belt or chain and sprocket arrangement 66.

From the foregoing description taken in connection with the accompanying drawings, it will be readily obvious to those skilled in the art to which an invention of this character appertains, that I provide a novel means for conveying the load from a truck or other vehicle, which will permit the discharge of the load at a remote point without the necessity of manual labor other than that required for connecting the conveying sections 32' and which will in general increase the speed at which the material may be discharged from the conveying truck or vehicle.

What I claim as my invention is:

1. The combination with a vehicle including a wheeled chassis frame, a propelling motor therefor, a load receiving body tiltably mounted on the frame and having a material discharge and means for tilting the body to cause the material therein to shift to its discharge, of a pneumatic conveyor apparatus mounted on the chassis frame for receiving the material from the body discharging and conveying the same to a remote point.

2. The combination with a vehicle including a wheeled chassis frame, a propelling motor therefor a load receiving body tiltably mounted on the frame and having a material discharge and means for tilting the body to cause the material therein to shift to its discharge, of a pneumatic conveyer apparatus mounted on the chassis frame for receiving the material from the body discharge and conveying it to a remote point, and comprising a blower fan, a conveyer air duct leading therefrom to a point of discharge, a feeder casing connecting the body discharge with the air duct whereby the material is discharged therefrom into the air duct and therethrough conveyed by the pressure current of air created therein by the blower fan, and means drivingly connecting the blower fan with the propelling motor.

3. The combination with a vehicle including a wheeled chassis frame, a propelling motor therefor, a load receiving body tiltably mounted on the frame and having a material discharge and means for tilting the body to cause the material therein to shift to its discharge, of a pneumatic conveyer apparatus mounted on the chassis frame for conveying the material from the body to a remote point, and comprising a blower fan, a conveyer air duct leading therefrom to a point of discharge, a feeder casing connecting the body discharge with the air duct whereby the material is discharged from the body into the air duct and therethrough conveyed by the pressure current of air created therein by the blower fan, mechanical feeding means in the feeder casing, and means for drivingly connecting the blower fan and mechanical feeding means with the vehicle motor.

4. The combination with a vehicle including a wheeled chassis frame, a propelling motor therefor, a load receiving body tiltably mounted on the frame and having a material discharge and means for tilting the body to shift the material therein to the discharge, of a blower fan mounted on the chassis frame, a conveying air duct leading from the fan and mounted on the chassis frame, a feeder casing carried by the tiltable body, a conveying duct leading from the feeder casing and through which material is conveyed to a remote point, and a flexible duct connecting the first mentioned conveying air duct with the feeder casing whereby the body may be tilted without affecting the conveying means.

5. The combination with a vehicle including a wheeled chassis frame, a propelling motor therefor, a load receiving body tiltably mounted on the frame and having a material discharge and means for tilting the body to shift the material therein to its discharge, of a pneumatic conveyor apparatus mounted on the chassis frame, a material feeding apparatus carried by the tiltable body, and means connecting the pneumatic conveyor apparatus with the material feeding apparatus whereby the body may be tilted without disturbing the conveying and the feeding apparatus.

6. The combination with a vehicle having a wheeled chassis frame, a propelling motor therefor, a load receiving body tiltably mounted on the frame and having a material discharge and means for tilting the body to shift the material therein to its discharge, of a blower fan mounted on the chassis frame, means for drivingly connecting the blower fan with the propelling motor, a conveying air duct leading from the fan and mounted on the chassis frame, a feeder casing carried by the tiltable body, a flexible duct connecting the air duct with the feeder casing, a mechanical feeder mounted within the feeder casing, and means for drivingly connecting the mechanical feeder with the blower fan whereby the body may be tilted to any desired position without disturbing the driving relations of the parts.

In testimony whereof I affix my signature.

GEORGE BERNERT.